United States Patent
Spencer et al.

(10) Patent No.: US 7,152,138 B2
(45) Date of Patent: Dec. 19, 2006

(54) SYSTEM ON A CHIP HAVING A NON-VOLATILE IMPERFECT MEMORY

(75) Inventors: Andrew M. Spencer, Eagle, ID (US); Tracy Ann Sauerwein, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 330 days.

(21) Appl. No.: 10/769,692

(22) Filed: Jan. 30, 2004

(65) Prior Publication Data
US 2005/0172066 A1 Aug. 4, 2005

(51) Int. Cl.
G06F 12/16 (2006.01)
G06F 13/00 (2006.01)
G06F 11/10 (2006.01)

(52) U.S. Cl. ........... 711/103; 711/131; 711/149; 711/168; 711/203; 714/8

(58) Field of Classification Search ........... None
See application file for complete search history.

(56) References Cited

U.S. PATENT DOCUMENTS

| | | | |
|---|---|---|---|
| 5,123,016 A * | 6/1992 | Muller et al. ............... 714/711 |
| 5,255,374 A | 10/1993 | Aldereguia et al. |
| 5,410,707 A * | 4/1995 | Bell ............................. 713/2 |
| 5,557,596 A * | 9/1996 | Gibson et al. ............... 369/101 |
| 5,723,355 A | 3/1998 | Chang et al. |
| 5,844,910 A * | 12/1998 | Niijima et al. ............... 714/710 |
| 5,884,067 A * | 3/1999 | Storm et al. ................ 345/533 |
| 6,119,245 A * | 9/2000 | Hiratsuka ..................... 714/7 |
| 6,145,069 A | 11/2000 | Dye |
| 6,317,371 B1 * | 11/2001 | Katayama et al. .......... 365/200 |
| 6,385,078 B1 | 5/2002 | Jeon |
| 6,457,108 B1 | 9/2002 | Hsu et al. |
| 6,466,471 B1 * | 10/2002 | Bhattacharyya .............. 365/55 |
| 6,601,126 B1 | 7/2003 | Zaidi et al. |
| 6,661,698 B1 | 12/2003 | Kang |
| 6,917,967 B1 * | 7/2005 | Wu et al. ..................... 709/213 |
| 6,961,807 B1 * | 11/2005 | Hauck .......................... 711/103 |
| 2002/0184579 A1 * | 12/2002 | Alvarez et al. ............... 714/719 |
| 2003/0061552 A1 * | 3/2003 | Su et al. ...................... 714/708 |
| 2003/0140288 A1 * | 7/2003 | Loaiza et al. ................ 714/718 |

* cited by examiner

*Primary Examiner*—Reginald Bragdon
*Assistant Examiner*—Shawn Gu

(57) ABSTRACT

A system-on-a-chip is described herein. The system-on-a-chip includes a microprocessor, a non-volatile imperfect semiconductor memory device and a memory controller. The memory controller is configured to transfer device data between the microprocessor and the non-volatile semiconductor imperfect memory device.

24 Claims, 2 Drawing Sheets

SYSTEM ON A CHIP HAVING A NON-VOLATILE IMPERFECT MEMORY

BACKGROUND OF THE INVENTION

Mobile electronic devices, such as digital cameras, personal digital assistants (PDA's), and cell phones continue to increase in popularity. Such portable devices are commonly manufactured using application specific integrated circuit (ASIC) designs. Conventional ASIC design involves development of medium complexity integrated circuits (ICs) essentially comprising core logic and some hard macros, such as on-chip static random access memories (SRAMs). However, as semiconductor processing technology continues to advance, more complicated IC designs have evolved, such as system-on-chip (SoC) designs.

A continuing trend is to manufacture mobile electronic devices utilizing SoC designs. However, while often referred to as SoC devices, conventional SoC-based mobile electronic devices continue to utilize memory devices that are not part of the SoC. These "off-chip" memory devices can be broadly categorized as either removable or non-removable devices.

Non-removable memory devices typically comprise volatile memory devices, such as SRAM or dynamic random access memory (DRAM) devices, which are located on a printed circuit board (PCB) along with the associated SoC. Such memory have a high degree of reliability, with each bit basically being guaranteed as "good" by manufacturers, which has led to these devices sometimes being referred to as "perfect" memory devices. These so-called perfect memory devices do not require error correction means, and thus greatly simplify the design and reduce the cost of any memory control/interface circuitry internal to the SoC. However, the memory devices themselves can be expensive and can potentially consume large amounts of limited battery capacity.

Removable memory devices are generally some type non-volatile flash memory device used for data storage and typically comprise some type of removable form factor card, such as a CompactFlash (CF) or Smart Media card. Memory cards provide flexibility as to the memory requirements of an individual user and remove the cost of the memory device from the initial cost of the mobile electronic device, thus making them more attractive to consumers. However, while the cost of the memory device itself is eliminated, removable memory devices require costly interface circuitry. In addition to expensive physical interface connections between the device and the memory card, such as the male/female pin configuration of a CF card, some SoC-based mobile electronic devices continue to utilize a separate memory controller chip to support the addressing/error correction required to support communication between the SoC and the memory card. Additionally, the memory controller and physical interface are essentially duplicated as part of the removable memory card, further raising the ultimate cost of the device to a consumer. Also, while continually being increased, the storage capacities of these devices is still relatively limited as driven by cost and/or space concerns.

SUMMARY OF THE INVENTION

Embodiments of the present invention provide a system-on-a-chip having, a microprocessor, a non-volatile imperfect semiconductor memory device and a memory controller. The memory controller is configured to transfer device data between the microprocessor and the non-volatile semiconductor imperfect memory device.

BRIEF DESCRIPTION OF THE DRAWINGS

Embodiments of the invention are better understood with reference to the following drawings. The elements of the drawings are not necessarily to scale relative to each other.

DESCRIPTION OF THE PREFERRED EMBODIMENTS

Figure 1:
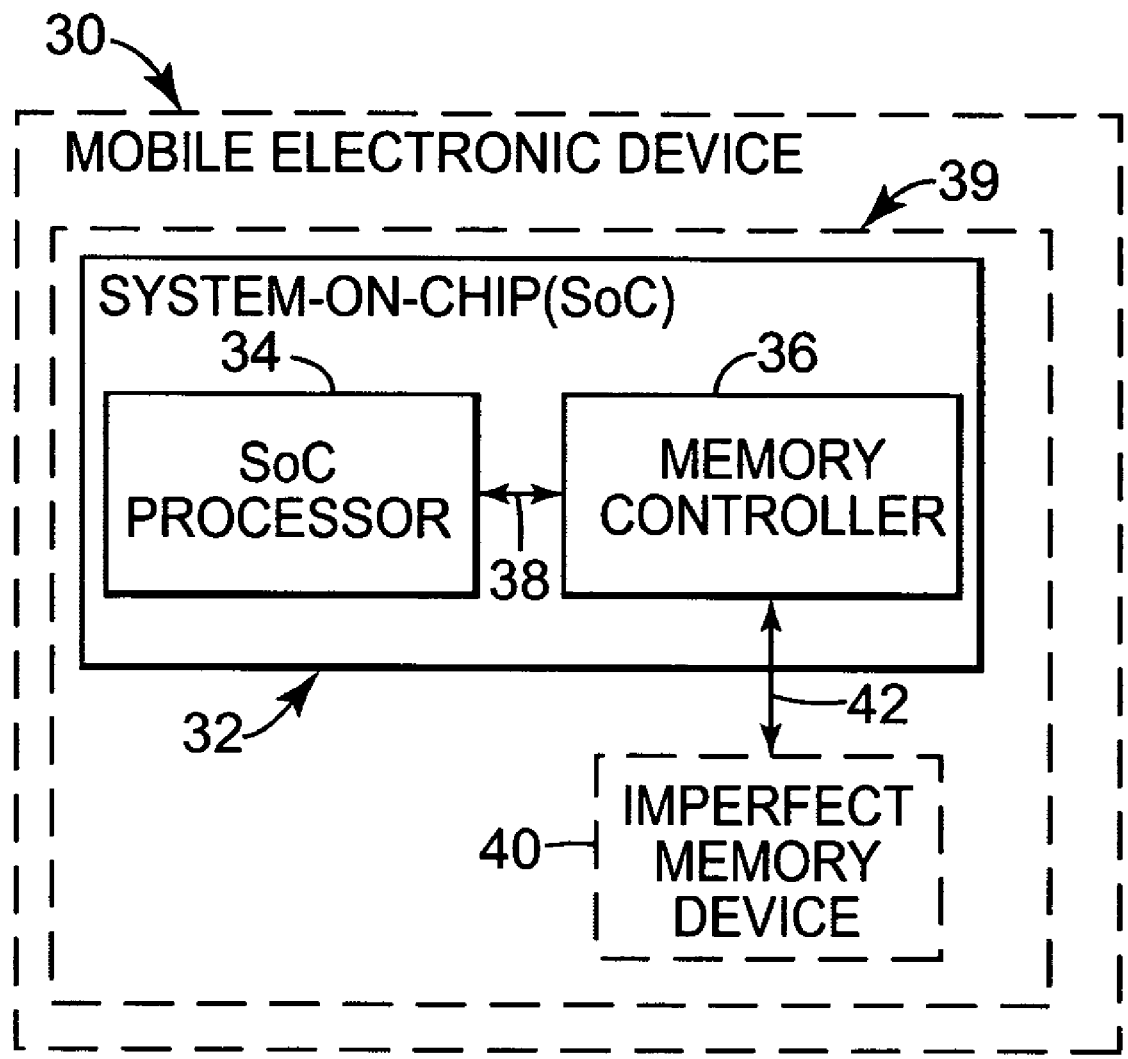
FIG. 1 is a block diagram of a mobile computing device utilizing one exemplary embodiment of a system-on-a-chip according to the present invention.

FIG. 1 is a block diagram illustrating a mobile computing device 30 utilizing one exemplary embodiment of a system-on-a-chip (SoC) 32 according to the present invention. A mobile computing device is defined as a portable microprocessor-based electronic device. Examples of a mobile computing device include a notebook computer, a laptop computer, a tablet PC, a personal digital assistant or wireless phone.

SoC 32 comprises a processor 34, a memory controller 36, and a non-volatile semiconductor-based imperfect (NS-VBI) memory device 40 incorporated onto a same silicon stack. Memory controller 36 is coupled to Soc processor 34 via a first control path 38 and to non-volatile semiconductor-based imperfect memory device 40 via a second control path 42. An imperfect memory device is herein defined as a high-density semiconductor-based memory device that, in addition to having permanent errors, will periodically have a random memory bit that is temporarily in error, and thus require some type of error correction and/or memory mapping in order to provide reliable data storage. Examples of such an imperfect memory devices are ARS (Atomic Resolution Storage) and MRAM (magnetic random access memory) devices.

In one embodiment, non-volatile semiconductor-based imperfect memory device 40 is external to SoC 32 and connectable to memory controller 36 via second control path 42. In one embodiment, SoC 32 and the external non-volatile semiconductor-based imperfect memory device 40 are part of a single printed circuit board 39.

Memory controller 36 is configured to receive from and send to SoC processor 34 via first control path 38 at least one data block having an associated logical block address. Memory controller 36 is further configured to translate the associated logical block address to a corresponding physical block address, and to provide for the at least one data block an error correction code (ECC) that is a function of the at least one data block. Memory controller 36 is further configured to send to and to receive from non-volatile semiconductor-based imperfect memory device 40 via data path 42 the at least one data block and corresponding ECC using the corresponding physical block address. Memory controller 36 also provides error detection/correction for the at least one data block based on the at least one data block and ECC received from non-volatile semiconductor-based imperfect (NVSBI) memory device 40 to thereby provide processor 34 with substantially reliable read/write access to NVSBI memory device 40.

In one embodiment, imperfect memory controller 36 is configured to support the transfer of data between SoC processor 34 and imperfect memory device 40, wherein imperfect memory device 40 is an ultra-high density ARS device. ARS is an emerging technology based on using a field emitter to generate a beam of electrons to change a state of a storage area in a storage medium, wherein the state of the storage area is representative of the stored information. One such memory device is described in Gibson et al. U.S. Pat. No. 5,557,596, incorporated herein by reference.

Gibson describes a storage device having a plurality of field emitters in close proximity to a storage medium, and a micromover. The storage medium has a plurality of storage areas, and the field emitters are spaced apart so that one field emitter is responsible for a sub-plurality of storage areas on the storage medium. Each storage area can be in one of a few different states, but binary information is stored with one state representing a high bit and another state representing a low bit. When a field emitter bombards a storage area with an electron beam, a signal current is generated. The magnitude of the signal current depends on the state of the storage area. Thus, the information contained in the storage area can be read by measuring the signal current. The magnitude of each electron beam can be increased to a pre-selected level to change the state of the storage area on which it impinges. Thus, information can be written on the storage areas by using the electron beams to change the state a storage area.

Both the field emitters and the micromover are made using semiconductor microfabrication techniques. The micromover scans the storage medium with respect to the emitters or vice versa. In this way, each emitter can access information from a plurality of storage areas on the medium. By using hundreds or thousands of field emitters reading and/or writing in parallel, ARS storage devices, in addition to providing ultra-high storage densities, can potentially provide very fast access times and data rates.

In one embodiment, imperfect memory controller 36 is configured to support the transfer of data between SoC processor 34 and imperfect memory device 40, wherein imperfect memory device 40 is magnetic random access memory device (MRAM). MRAM is an emerging memory technology that utilizes magnetic domains rather than electrical charges, as used by DRAM, SRAM, and flash memory, for storage of data. MRAM devices have many potential advantages such as being faster and using less battery power than currently utilized forms of electronic memory while providing equal, and potentially greater, storage density. One suitable MRAM device is described in "Lower Power MRAM Memory Array", U.S. Pat. No. 6,466,471, incorporated herein by reference.

A typical MRAM device comprises a plurality of conductive traces referred to as word lines and bit lines routed across an array of memory cells. Word lines extend along rows of the memory cell array and bit lines extend along columns of the memory cell array. Memory cells are located at a cross point of each work line and bit line. Memory cells may be of different types, such as a magnetic tunnel junction (MJT) memory cell or a giant magnetoresistive (GMR) memory cell. Generally, the magnetic memory cell includes a first layer of magnetic film in which the orientation of magnetization if alterable and a second layer of magnetic film in which the orientation of magnetization may be fixed or "pinned" in a particular direction. The magnetic film having alterable magnetization is referred to as a sense layer or data storage layer and the magnetic film layer that is fixed is referred to as a reference layer or a pinned layer.

Each memory cell stores a bit of information as an orientation of magnetization in the sense layer. The magnetization orientation of a selected memory cell is switched by supply currents provided to the word line and bit line that cross at the selected memory cell. The currents create magnetic fields that, when combined, switch the magnetization orientation of the sense layer from parallel to anti-parallel with respect to the orientation of magnetization of the reference layer, or vice versa. These two stable orientations, parallel and anti-parallel, respectively represent the binary logic values of "1" and "0."

The resistance through the memory cell differs according to whether the orientation of magnetization of the sense layer and the reference layer is parallel or anti-parallel. This resistance is highest when the orientation is anti-parallel (logic state "0") and lowest when the orientation is parallel (logic state "1"). Thus, the state of the memory cell can be determined by sensing the resistance of the memory cell.

By integrating memory controller 36 and non-volatile semiconductor-based imperfect memory device 40 onto SoC 32, SoC processor 34 is able to read/write data directly to NVSBI memory device 40 without the need for costly physical electrical interconnections (i.e., male-female pin connectors), a separate memory device (i.e., CompactFlash memory card), and/or a separate memory controller chip.

Figure 2:
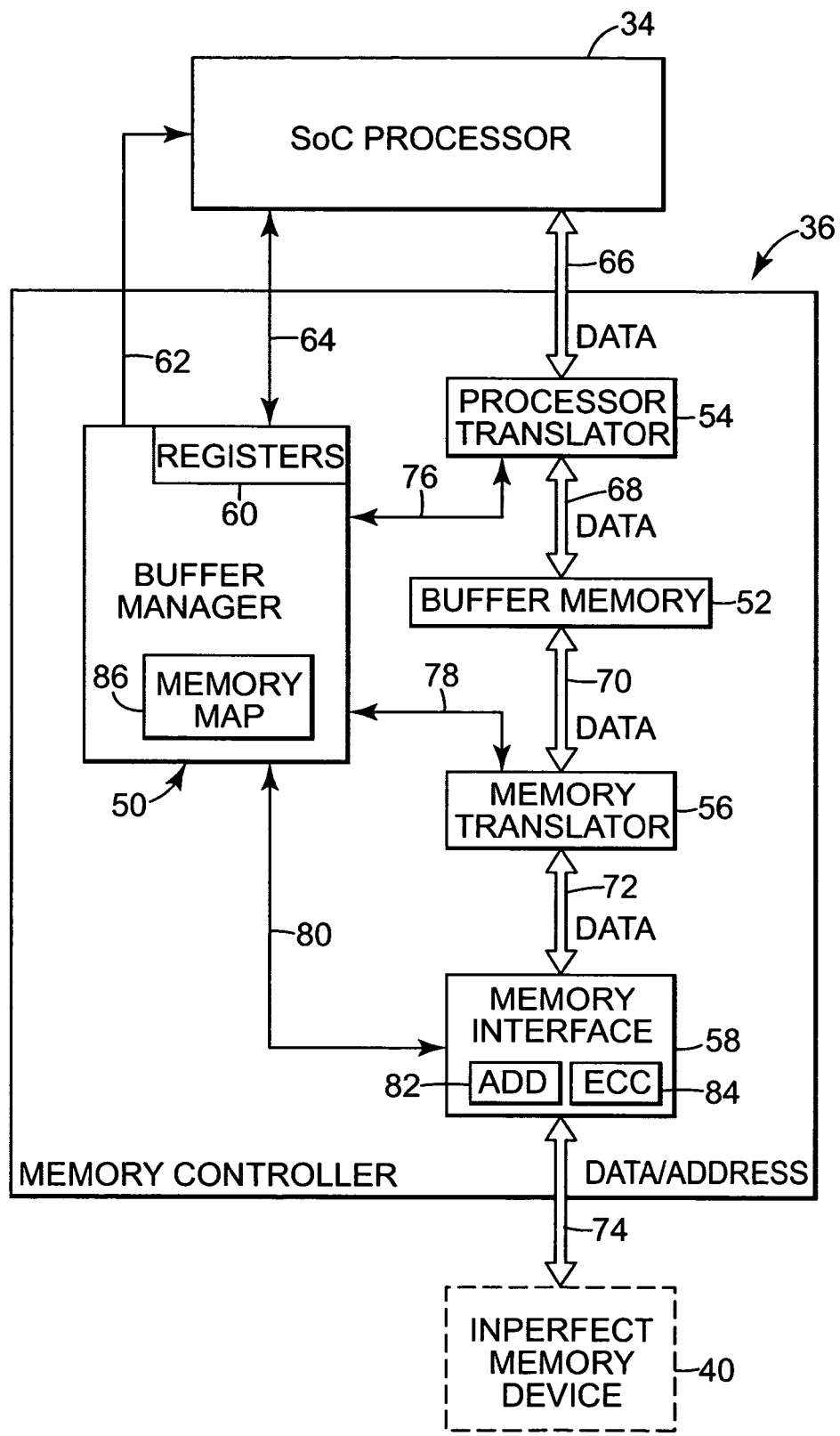
FIG. 2 is a block diagram illustrating one exemplary embodiment of an imperfect memory controller according to the present invention for use in a system-on-a-chip.

FIG. 2 is a block diagram illustrating one exemplary embodiment of on-chip memory controller 36 according to the present invention. Memory controller 36 includes a buffer manager 50, a processor translator 52, a buffer memory 54, a memory translator 56, and a memory interface 58. Buffer manager 50 further includes a plurality of "setup" registers 60.

Buffer manager 50 comprises hardware-implemented logic configured to manage data transfer between SoC processor 34 and imperfect memory device 40 by coordinating access to buffer memory 52. Buffer manager 50 enables SoC processor 34 to write/read data to/from one location within buffer memory 52 while data is concurrently being written to/from imperfect memory device 40 from/to another location within buffer memory 52.

Buffer 50 is coupled to SoC processor 34 via a control data path 64. In one embodiment, control path 64 is utilized by SoC processor 34 to communicate input commands and set-up information to buffer manager 50 to enable the transfer of data from Soc processor 34 to imperfect memory device 40. Data is commonly transferred between devices in the form of blocks, wherein one block data block comprises multiple bytes of data. Thus, the set-up information includes information such as clocking information, the number of blocks to be transferred and their associated logical block addresses, and any necessary DMA (direct memory access) signaling if processor 34 is DMA capable. The input commands and set-up information are stored in the plurality of set-up registers 60 and accessed by the hardware-implemented logic of buffer manager 50. Set-up registers 60 also include information regarding buffer memory 52 such as available space within buffer memory 56 and where to begin the transfer of data. In one embodiment, buffer manager 50 further utilizes control path 64 to communicate interrupts to SoC processor 34 to notify SoC processor 34 of things such as the completion of a data transfer or whether a data error has been detected.

In one embodiment, buffer manager 50 includes a memory mapping block 86 to translate the logical block addresses utilized by SoC processor 34 to physical block addresses utilized by imperfect memory device 40. Generally, imperfect memory devices, such as imperfect memory device 40, include manufacturer provided memory mapping data indicating the imperfect memory locations or other memory locations that should not be over-written. In one embodiment, this memory mapping data is uploaded at system boot-up from a plurality of reserved storage areas on imperfect memory device 40 and stored in set-up registers 60. The memory mapping data is then utilized by memory mapping block 86 to translate logical block addresses to physical block addresses, and vice-versa. In one embodiment, the memory mapping data is uploaded at boot-up from imperfect memory device 40 and stored in a memory within SoC processor 34 rather than in set-up registers 60 of buffer manager 50. SoC processor 34 then utilizes the memory mapping data to translate between logical and physical block addresses in lieu of memory mapping block 86.

Buffer memory 52 is a data buffer having a plurality of bit positions. Many devices, such as CompactFlash memory cards and hard disc drives, transfer data in the form of blocks wherein each block comprises 512 bytes of data. Thus, in one embodiment, the number of bit positions in buffer memory 52 comprises a multiple of 512 bytes thereby allowing buffer memory 52 to concurrently store multiple data blocks. In one embodiment, buffer memory 52 is configured to function as a circular buffer wherein a first block of data can be transferred into buffer memory 52 while a second block of data is simultaneously being transferred out of buffer memory 52. As an illustrative example, if buffer memory 52 has five data block positions (2,560 bytes), a first data block can be transferred out of block position 1 while a second data block can be transferred into, for instance, block position 5. In one embodiment, buffer memory 52 comprises a plurality of data block positions.

Processor translator 54 is coupled to SoC processor 34 via SoC processor data bus 66 and to buffer memory 52 via a first buffer data bus 68, and comprises hardware implemented translation logic configured to synchronize the operation of processor data bus 66 and first buffer data bus 68. Processor translator 54 compensates for those scenarios where the processor data bus operates at a different rate, usually higher, than buffer memory 52 and/or where processor data bus 66 has a different bus width than first buffer data bus 68. As an illustrative example, SoC processor may be an ARM (Advanced RISC Machines, Ltd) core having an AHB (Advanced High-Performance) bus operating at 50 MHz and having width of 32-bits while first buffer data bus 68 may operate at 100 MHz and have a bus width of 16-bits. In one embodiment, processor translator 54 includes a buffer, or buffers, in the translation logic to temporarily store data received via a higher speed and/or greater width processor data bus for later transfer buffer memory 52, thereby freeing processor data bus 66 for subsequent operations. Processor translator 54 also includes translation logic to coordinate the transfer data blocks to the appropriate data block position within buffer memory 52.

Memory translator 54 is coupled to buffer memory 56 via a second buffer data bus 70 and to memory interface 58 via a first memory bus 72 and functions in a fashion similar to that of processor translator 54, except that memory translator 56 comprises hardware implemented translation logic configured to synchronize the operation of second buffer data bus 70 and first memory bus 72. Memory translator 56 compensates for those scenarios where buffer data bus 70 and first memory bus 72 operate at different rates and/or have different bit widths.

Memory interface 58 is coupled to memory translator 56 via first memory bus 72 and to imperfect memory device 40 via a second memory bus 74, and is coupled to buffer manager 50 via a control path 80. Memory interface comprises a hardware implemented addressing logic block 82 and a hardware implemented error correction code (ECC) logic block 84. When receiving a data block to be written to imperfect memory device 40 via first memory bus 72, ECC logic 84 generates an ECC comprising a plurality of bits for the data block that is a function of the data block. The ECC is then appended to the data block prior to writing the data block to imperfect memory device 40.

When reading a data block read from imperfect memory device 40, ECC logic 84 generates an expected ECC from the data block read from imperfect memory device 40 and compares the expected ECC to the ECC read from imperfect memory device 40 to determine whether the data block is in error. ECC logic 84 is configured to correct certain types of data errors and configured to provide an error indication to one of the plurality of set-up registers in buffer manager 50 via control path 80 if the data block contains an error of a type that is not correctable by ECC logic 84.

Addressing logic 82 receives the physical block addresses associated with data blocks to be read from or written to imperfect memory device from buffer manager 50 via control path 80 and generates the necessary control and address signals to read the data block from or write the data block to imperfect memory device 40. Both the address/control signals and data block are transmitted to imperfect memory device 40 via second memory bus 74.

In conclusion, by integrating memory controller 36 onto SoC 32, SoC processor 34 is able to read/write data directly to imperfect memory device 40 located within mobile electronic device 30 without the need for a separate memory controller chip or costly physical electrical interconnections (i.e., male-female pin connectors).

What is claimed is:

1. A system-on-a-chip comprising:
   a microprocessor;
   a non-volatile imperfect semiconductor memory device;
   a memory controller separate from the microprocessor and transferring data between the microprocessor and the non-volatile semiconductor imperfect memory device;
   a buffer memory receiving plural data blocks from the microprocessor and sending the plural data blocks to the non-volatile semiconductor-based imperfect memory device; and
   a buffer manager including (1) a hardware-implemented logic block managing transfer of the plural data blocks between the microprocessor and the non-volatile semiconductor-based imperfect memory device, and (2) a memory mapping block receiving from the non-volatile semiconductor-based imperfect memory device a memory map indicating reserved memory locations within the non-volatile semiconductor-based imperfect memory device,
   wherein the buffer manager enables the microprocessor to access a first data block at a first location within the buffer memory while a second data block is concurrently written to the non-volatile semiconductor-based imperfect memory device from a second location within the buffer memory,
   wherein the buffer manager receives plural set-up information blocks from the microprocessor,
   wherein each of the set-up information blocks comprises information to transfer the plural data blocks between the microprocessor and the non-volatile semiconductor-based imperfect memory device.

2. The system-on-a-chip of claim 1, further comprising:
   a translator configured to translate logical block addresses to corresponding physical block addresses on the non-volatile imperfect semiconductor memory device during execution of a read or write command.

3. The system-on-a-chip of claim 1, further comprising: error correction of data transferred between the microprocessor and the non-volatile imperfect semiconductor memory device.

4. The system-on-a-chip of claim 3, wherein the memory controller is configured to provide error correction.

5. The system-on-a-chip of claim 1, wherein the non-volatile semiconductor-based imperfect memory device is an atomic resolution memory device.

6. The system-on-a-chip of claim 1, wherein the non-volatile semiconductor-based imperfect memory device is a magnetic random access memory device.

7. The system-on-a-chip of claim 1, wherein the microprocessor reads and writes data directly to the non-volatile semiconductor-based imperfect memory device without a need for a separate memory controller chip or physical electrical interconnections.

8. A system-on-a-chip comprising:
a microprocessor;
a non-volatile semiconductor-based imperfect memory device;
a memory controller separate from the microprocessor and receiving from the microprocessor at least one data block having an associated logical block address, to translate the associated logical block address to a corresponding physical block address, to provide for the at least one data block an error correction code that is a function of the at least one data block, to send the at least one data block and error correction code to the non-volatile semiconductor-based imperfect memory device, and to provide error detection and correction for the at least one data block based on the at least one data block and error correction code read from the non-volatile semiconductor-based imperfect memory device;
a buffer memory receiving plural data blocks, including the at least one data block, from the microprocessor and sending the plural data blocks to the non-volatile semiconductor-based imperfect memory device; and
a buffer manager enabling the microprocessor to access a first data block at a first location within the buffer memory while a second data block is concurrently written to the non-volatile semiconductor-based imperfect memory device from a second location within the buffer memory,
wherein the buffer manager receives plural set-up information blocks from the microprocessor,
wherein each of the set-up information blocks comprises information to transfer the plural data blocks between the microprocessor and the non-volatile semiconductor-based imperfect memory device.

9. The system-on-a-chip of claim 8, wherein the buffer memory is configured as a circular buffer.

10. The system-on-a-chip of claim 8, wherein the buffer memory comprises a number of bit positions wherein the number of bit positions is a multiple of a number of bit positions in the at least one data block.

11. The system-on-a-chip of claim 10, wherein the number of buffer memory bit positions is a multiple of 512.

12. The system-on-a-chip of claim 8, wherein each set-up information blocks contains information comprising a number of data block to be transferred and their associated logical block addresses.

13. The system-on-a-chip of claim 8, wherein the plurality of set-up information blocks is stored in a plurality of set-up registers.

14. The system-on-a-chip of claim 13, wherein the memory controller further comprises:
a processor translator comprising:
a hardware-implemented logic block configured to synchronize a transfer of the plurality of data blocks between the microprocessor and the buffer memory.

15. The system-on-a-chip of claim 14, wherein the hardware-implemented logic block comprises:
a plurality of buffers configured to synchronize transfer of the plurality data block between the microprocessor transferring data at a first bit-width and the buffer memory transferring data at a second bit-width.

16. The system-on-a-chip of claim 14, wherein the hardware-implemented logic block comprises:
a plurality of buffers configured to synchronize transfer of the plurality of data blocks between the microprocessor transferring data at a first data rate and the buffer memory transferring data at a second data rate.

17. The system-on-a-chip of claim 8, wherein the memory controller further comprises:
a memory translator comprising:
a hardware-implemented logic block configured to synchronize a transfer of the plurality of data blocks between the buffer memory and the non-volatile semiconductor-based imperfect memory device.

18. The system-on-a-chip of claim 17, wherein the hardware-implemented logic block comprises:
a plurality of buffers configured to synchronize transfer of the plurality of data blocks between the microprocessor transferring data at a first bit-width and the buffer memory transferring data at a second bit-width.

19. The system-on-a-chip of claim 17, wherein the hardware-implemented logic block comprises:
a plurality of buffers configured to synchronize transfer of the plurality of data blocks between the microprocessor transferring data at a first data rate and the buffer memory transferring data at a second data rate.

20. The system-on-a-chip of claim 8, wherein the memory controller further comprises:
a memory interface configured to receive from the buffer manager the physical block address for the at least one data block, to provide the error correction code for the at least one data block, to write/read the at least one data block and associated error correction code to/from the non-volatile semiconductor-based imperfect memory device, and to provide the error correction/detection for the at least one data block using the at least one data block and associated error correction code read from the non-volatile semiconductor-based imperfect memory device.

21. The system-on-a-chip of claim 20, wherein the memory interface comprises a hardware implemented logic block.

22. A mobile electronic device comprising:
a system-on-a-chip comprising:
a microprocessor;
a non-volatile semiconductor-based imperfect memory device;
a memory controller separate from the microprocessor to receive from the microprocessor at least one data block having an associated logical block address, to translate the associated logical block address to a corresponding physical block address, to provide for the at least one data block an error correction code (ECC) that is a function of the at least one data block, and to send the at least one data block and error correction code to the non-volatile semiconductor-based imperfect memory device;

a buffer memory receiving plural data blocks from the microprocessor and sending the plural data blocks to the non-volatile semiconductor-based imperfect memory device; and a buffer manager including (1) a hardware-implemented logic block managing transfer of the plural data blocks between the microprocessor and the non-volatile semiconductor-based imperfect memory device, and (2) a memory mapping block receiving from the non-volatile semiconductor-based imperfect memory device a memory map indicating reserved memory locations within the non-volatile semiconductor-based imperfect memory device, wherein the buffer manager enables the microprocessor to access a first data block at a first location within the buffer memory while a second data block is concurrently written to the non-volatile semiconductor-based imperfect memory device from a second location within the buffer memory, wherein the buffer manager receives plural set-up information blocks from the microprocessor, wherein each of the set-up information blocks comprises information to transfer the plural data blocks between the microprocessor and the non-volatile semiconductor-based imperfect memory device.

23. The mobile electronic device of claim 22, wherein the non-volatile semiconductor-based imperfect memory device is an ultra-high density atomic resolution memory device.

24. The mobile electronic device of claim 22, wherein the non-volatile semiconductor-based imperfect memory device is a magnetic random access memory device.

* * * * *